United States Patent

[11] 3,608,024

| [72] | Inventors | Masahide Yazawa;<br>Yoshiaki Murono; Kazuhiko Kurihara, all of Tokyo, Japan |
|---|---|---|
| [21] | Appl. No. | 703,710 |
| [22] | Filed | Feb. 7, 1968 |
| [45] | Patented | Sept. 21, 1971 |
| [73] | Assignee | Polymer Processing Research Institute Ltd. Itabashiku, Tokyo, Japan |
| [32] | Priority | Feb. 9, 1967 |
| [33] | | Japan |
| [31] | | 42/8581 |

[54] METHOD FOR PRODUCING CRIMPED CONJUGATED SPLIT FIBER
6 Claims, 1 Drawing Fig.

[52] U.S. Cl. .................... 264/103,
156/229, 264/147, 264/DIG. 8
[51] Int. Cl. .................... B29d 7/24
[50] Field of Search .................... 264/147,
171, 103, DIG. 8; 156/229

[56] References Cited
UNITED STATES PATENTS

| 2,335,190 | 11/1943 | Minich | 264/290 X |
| 3,033,707 | 5/1962 | Lacy | 264/171 X |
| 3,177,557 | 4/1965 | White | 264/280 X |
| 3,181,224 | 5/1965 | Tanner | 161/177 |
| 3,255,065 | 6/1966 | Wyckoff | 264/171 X |
| 3,398,441 | 8/1968 | Adachi | 264/147 X |
| 3,399,259 | 8/1968 | Brayford | 264/168 |
| 2,666,976 | 1/1954 | Olmer | 264/167 X |
| 3,484,916 | 12/1969 | Johnstone | 264/146 X |

*Primary Examiner*—Robert F. White
*Assistant Examiner*—Richard R. Kucia
*Attorney*—Lawrence I. Field ABSTRACT: Method for producing crimped conjugated split fibers which comprises stretching simultaneously two kinds of films or tapes having mutual affinity but different heat-induced shrinkage which are stretchable with approximately the same stretch ratio in piled state whereby said two kinds of films or tapes are mutually adhered to form an integrally conjugated stretched film, splitting the resultant integrally conjugated stretched film into conjugated split fibers having potential shrinkage and developing crimps upon the goods made of said split fibers by heating under tensionless state.

PATENTED SEP21 1971   3,608,024
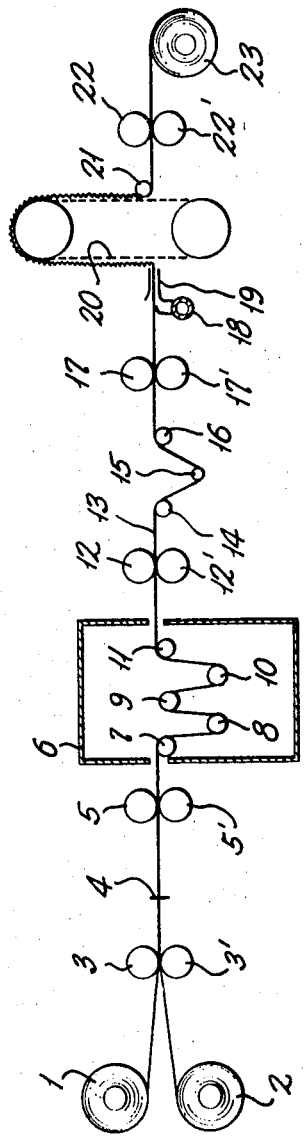
INVENTORS
MASAHIDE YAZAWA,
YOSHIAKI MURONO &
KAZUHIKO KURIHARA
BY Lawrence J Field
ATTORNEY

METHOD FOR PRODUCING CRIMPED CONJUGATED SPLIT FIBER

CROSS-REFERENCES TO RELATED APPLICATION

This invention relates to an improvement on the method disclosed in the copending Japanese Pat. application No. 23,966/1966 filed by one of the inventors of this application, entitled "method for the preparation of crimped split fibers."

BACKGROUND OF THE INVENTION

1. Field of the Invention

The present invention relates to a method for producing conjugated split fibers having excellent permanent crimp.

2. Description of the Prior Art

Heretofore-known methods for crimping manmade fibers included false-twisting method with heat-setting, stuffing box method (turbocrimper method), gear-crimping method, abrasion method, conjugation-coagulation method of two kind of polymers, etc. Among these, it is believed that the last method, namely conjugation-coagulation method, in which streams of two kinds of polymers are put together or conjugated before coagulation after passing through a spinneret, provide excellent crimp characteristics to fibers particularly in crimp recovery, crimp stability, and bulkiness. In the conjugation coagulation method which uses a spinneret, it is necessary that two kinds of polymer must be conjugated before coagulation.

According to the above-mentioned Japanese Pat. application No. 23,960/1966, conjugation of two kinds of split fibers of two different polymers can be carried out by adhesion on heating under a pressure, even if two different polymers are not conjugated before coagulation so long as either or both are processed in the film form. However, it is necessary that two different films have completed conjugation before stretching in all cases. Completely conjugated films are stretched and then subjected to splitting in the above-mentioned method.

It is an object of the present invention to provide a simpler method for providing crimped conjugated split fibers in which the conjugation of the components of split fibers does not require that they be in the state of films before stretching.

SUMMARY OF THE INVENTION

According to the method of the present invention, crimped conjugated split fibers are produced by simultaneously stretching two kinds of films or tapes having mutual affinity but different heat-shrinkage property which are stretchable with approximately the same stretch ratio in only piled state, splitting the resultant integrally conjugated stretched film into conjugated split fibers having potential shrinkage and developing crimp upon the goods made of said split fibers such as yarns, woven or knitted goods by heating under tensionless state.

BRIEF DESCRIPTION OF THE DRAWING

The single FIGURE is a schematic drawing showing the steps in the preferred embodiment of the present invention in which two raw films laid one over another are stretched and simultaneously converted into a conjugated stretched film of both constituent films, adhered to one another, firmly by heat and stretching pressure, and after being split, are spread on a revolving screen in tensionless state and wound up as crimped split fibers.

DETAILED DESCRIPTION (PREFERRED EMBODIMENT) OF THE INVENTION

When a conjugated stretched film is to be produced, it has been considered, as above-mentioned, heretofore that nonstretched film, must be the one conjugated. After persistently continued experiment, it has been confirmed by the present inventors that two different kinds of film having different properties particularly different heat-induced shrinkage, can be completely adhered and conjugated by stretching when they are stretched on heating in the state of being laid, one over another and further that the adhered and conjugated state thus established is stable and maintained even after subsequent steps of slide-rubbing carried out for the purpose of splitting or otherwise processing of fibers. Namely the present invention has been completed as the result of the confirmation that a conjugated stretched film can be obtained by laying two kinds of film, one over the other and stretching them together through the same stretching route without preliminary step of conjugating two kinds of film.

Of course, the attempt to obtain a conjugated stretched film by laying two kinds of film, one over another does not succeed between every two different films. For example, if a film such as regenerated cellulose film which is not further stretchable and another film such as polyethylene film which can be further stretched eight to 10 times the original length, are laid, one over the other, a conjugated stretched film cannot be produced. Further, even if films of nylon or polyester and of polyolefin are laid, one over the other and mutually adhered, it is difficult to produce a conjugated stretched film.

The combinations of films to which the method of the present invention can be effectively applied, are those in which two different films can be further stretched with an approximately the same stretch ratio. Further, the present invention is effective only in instances where the two different films have mutual chemical affinity. For example, in case of polypropylene, the method of the present invention can be applied effectively when there is difference of content of crystalline polymers included in two kinds of film, difference in the amount of comonomer, as a constituent of a copolymer in case of the same principal monomer, or difference in the conditions of coagulation or shaping condition of two kinds of film in case of the monomer of the same constituents. The conjugation by way of the present method is effective also between polyethylene films of middle-pressure and low-pressure processes. A blend of one kind of low- or middle-pressure polyethylene and 5-10 percent by weight of high-pressure polyethylene can also be successfully conjugated with the same kind of low- or middle-pressure polyethylene which is not blended with high-pressure polyethylene. It can be said that the former film is made of a polymer prepared from the same monomer, but has different crystalline polymer content from the latter. In case of a polyvinyl alcohol film completely saponified and a polyvinyl alcohol film containing some small quantities of residual acetal radicals, which can be denoted as a copolymer of vinylalcohol and a small amount of vinylacetate, the method of the present invention can be applied effectively.

In case of polyacrylonitrile also where a film of homopolymer and a film of copolymer containing 5 to 8 percent by weight of comonomer are laid over one another and stretched at 115-128° C. by heating with a saturated steam, the present conjugation is effected by the aid of a small quantity of moisture which performs the function of a swelling agent. Of course, when dimethylsulfoxide, dimethylformamide, or a thin solution prepared by dissolving polyacrylonitrile in one of the above-mentioned solvents, is thinly coated between two kinds of polyacrylonitrile films, they can be further stretched by eight to 10 times on heating at a temperature as low as 100° C. and a firmly adhered conjugated stretched film is produced by stretching.

In case of nylon or polyester film, two kinds of quenched films of two kinds of polymer of the same group or of the same polymer prepared by different coagulation or shaping conditions, can be stretched at a temperature less than 100° C. on dry heating or heating by steam to produce a conjugated film.

It is not a necessary condition for the present method to insert an adhesive, a solvent, or a swelling agent between the boundary surface of said two films laid one over another for the purpose of adhesion, but this maybe useful for low-temperature conjugation. The characteristic feature of the present invention rather lies in attaining the object of conjugation only by heat and pressure during stretching process without using any adhesive.

With regard to the reason of two kinds of films being adhered so simply and easily by the method of the present invention the following is what is inferred by the present inventors: when an unstretched film is to be stretched, the stretching is carried out usually on heating at a temperature higher than its secondary transition temperature. It is usually the case of rubberlike polymer that autogenous heat evolution occurs due to its entropy change during stretching. Accordingly, the heat generated accumulates in the film (which is a bad conductor) together with heat from outside heating and causes the rapid softening of the film itself. By the above mentioned softening and mutual pressure adhering action during stretching, the two films laid over one another are adhered to each other to form an integrated body. In practice, when two films are forced to pass over rollers or fixed bars to change their direction from time to time in zigzag way during stretching, the pressing force acting on said two films in the direction perpendicular to stretching becomes larger and the mutual adhesion of said two films becomes so strong that after stretching a conjugated stretched film nearly ideal for the production of conjugated crimped fibers is obtained.

The conjugated stretched film thus obtained can be split into split fiber webs (without causing the separation of layers) by way of any one of conventional splitting methods such as that which uses a cutter or a needle brush, a false twist method, a method which employs jet stream of air in splitting, or the method of the present inventor which employs a revolving file (cf. Ser. No. 510,546) etc. and the yarns or knitted or woven fabrics made of the resultant split fiber develops crimp on heating under tension due to the difference of shrinkage of the two raw films. The crimped conjugated split fiber thus obtained, even when the crimps are stretched during processing, recovers its excellent bulkiness on heating.

When split fibers is to be made by a certain splitting method which includes abrasion, it would be preferable to obtain better crimp characteristics to abrade the surface of the side of greater shrinkage, but abrasion is not always necessary in case of the conjugated stretched film produced according to the present invention, because sufficient crimps are developed without relying on abrasion.

The method of the present invention can be applied effectively to films of all kinds of fiber-forming polymer and the most effective results can be obtained when the present method is applied to films of two kinds of polymers of the same group. Illustrative polymers which are deemed to be suitable in the application of the present method are polyethylene, polypropylene, polyvinylchloride, polyvinylalcohol, polyacrylonitrile, polyvinylidenechloride, nylon, polyester, copolymers thereof, and regenerated cellulose derivatives.

As for production method of film, the present method can be applied to a film produced in any one of melt-extrusion method, dope-casting method, or wet coagulation method.

The method of the present invention can be understood more fully by referring to the figure which is a schematic drawing of the steps in which the present invention is put into practice to produce split fibers.

Two raw films 1 and 2 which show different shrinkage when stretched through the same course of stretching on heating, are laid over one another, fed to the first set of nip rollers 3 and 3', next to the second set of nip rollers 5 and 5' after having been slit in the piled state by a slitter 4 situated between the above-mentioned two sets of nip rollers into each set of piled films of predetermined width, and then introduced into a stretching chamber 6, in which a heated fixed roller 7 and rollers 8, 9, 10 and 11, freely rotatable by the stretching film, are accommodated and which is maintained at a appropriate temperature for stretching on heating and stretched between the second set of nip rollers 5 and 5' and the third set of nip rollers 12 and 12'.

In this process the necking of films at stretching occurs on the heated fixed roller 7 or just after passing over said roller and each set of two films adheres to each other to form conjugated stretched film 13, respectively in this stretching chamber 6.

The stretched film 13 is split by a splitter 15 through which it is guided by rotatable rollers 14 and 16 while the stretched film is under a slight tension exerted between the third set of nip rollers 12 and 12' and the fourth set of nip rollers 17 and 17' and then led to a nozzle 19 into which pressurized air is also fed through a pipe 18. From this nozzle, split fibers are ejected together with air against a slowly moving metal mesh belt 20 which allows the air freely to pass through, whereby they are deposited thereon in the tensionless and loosely spread state, and heated to develop crimps.

The crimped split fibers thus obtained are taken up by a set of rollers 22 and 22' guided by a roller 21 and then wound up on a bobbin 23.

The stretching can be carried out by the use of any suitable apparatus such as air oven, hot water bath, high-pressure steam chamber. However it is preferable to select an apparatus according to the group of film polymers. For instance, for a film of polypropylene made by melt-extrusion a dry air oven is suitable but for a film of polyacrylonitrile, a high-pressure steam chamber is suitable because the small quantity of moisture acts effectively as a plasticizer.

Following examples are illustrative of the method of the present invention, but are not to be construed as limiting and all percents in these examples are by weight.

Example 1

An unstretched film of homo-polypropylene 30 $\mu$ thick and 20 mm. wide and that of copolymer of propylene and ethylene (ethylene content 5 mol percent) were laid precisely over one another, introduced into the stretching chamber of the equipment shown in FIG. 1, heated up to 140° C., and stretched nine times to obtain a (conjugated) stretched film of double layers.

The stretched film thus obtained was split by using a revolving round file as a splitter and ejected against a revolving wire net drum heated to 110° C., by air to develop crimps and set them. The crimped split fiber obtained after setting, was wound up on a bobbin without twisting.

According to the testing method JISL 1077.*

* Crimp elongation degree: $(b/a-1)$ 100 JISL 1077. Fix the upper end of a sample by a clamp and hang it vertically by applying an initial weight of 2 mg./d. to it and after 30 sec., measure sample length accurately (a) by marking on it at a position of about 20 cm. from just below the upper clamp. Next, put a load 0.1 g./d. on the fiber and after 30 sec., measure the length of fiber (b) between the upper clamp and the marked point. The resultant crimped split fiber exhibited a crimp elongation of 72 percent and crimp recovery of 85 percent. In order to test the crimp stability, crimp elongation and crimp recovery of split fibers were measured after applying a load of 5 g./d., for 18 hrs., unloading and recovering the crimp by heating at 110 °C. The data measured were all the same as those measured before loading.

Then the two kinds of raw films were stretched separately under the same condition and the shrinkages of each stretched film at 110° C., were measured, whereby the shrinkage of stretched film of the copolymer was 12 percent and that of homo-polymer was 7.2 percent.

Example 2

An unstretched tape of polyacrylonitrile, 40 $\mu$ thick and 20 mm. wide and a tape of a copolymer of acrylonitrile and methylmethacrylate (methylmethacrylate content 7 mol percent) 50 $\mu$ thick and 20 mm. wide were laid over one another, stretched three times a length in a water bath at 70° C., and further by four times a length in a high-pressure steam chamber at 120° C., and in total, 12 fold stretching was carried out. In this case, the point of necking during stretching was fixed on the roller set near the inlet of said bath.

The stretched tape thus obtained was split by slide-rubbing the surface of copolymer side as in example 1 and the crimps were developed and fixed by dry heating at 90° C.

The crimp elongation and crimp recovery of the resultant crimped split fibers thus obtained were 85 percent and 78 percent, respectively.

Example 3

An unstretched tape of polyethylenterephthalate 20 μ thick and 20 mm. wide and that of a copolymer of polyethylene terephthalate and -isophthalate (isophthalic acid content 8 mol percent) 20 mm. wide and 20 μ thick were laid over one another, stretched by four times while sliding over a hot plate heated at 95° C., further stretched by 1.3 times while sliding over a hot plate heated at 170° C., subjected to heat treatment by sliding on a hot plate heated at 190° C., split according to the method of example 1 crimps were developed at 140° C.

The crimp elongation and crimp recovery of the crimped split fiber obtained were 95 percent and 85 percent, respectively.

Example 4

An unstretched tape of nylon-6 and that of nylon-66 both 30 μ thick and 20 mm. wide were laid over one another, stretched by three times by sliding over a hot plate heated at 150° C., and after splitting by a revolving cutter having a number of regularly distributed blades, crimps were developed at 140° C.

The crimp elongation and crimp recovery of the split fiber obtained were 102 percent and 88 percent, respectively.

What is claimed is:

1. A method for producing crimped conjugated split fibers which comprises:

uniaxially stretching together two kinds of films which have mutual affinity, but different thermal shrinkage and which are able to be stretched with substantially the same stretch ratio, in only piled state while changing the travelling direction of the films at least one time in the course of stretching whereby said two kinds of film adhere to each other firmly to form an integrally conjugated stretched film;

splitting said integrally conjugated stretched film into conjugated split fibers having potential crimping ability; and developing crimps in said split fibers on heating the fibers under relaxed state;

wherein said two kinds of films are made of fiber-forming polymers selected from the group consisting of homopolymers and copolymers of polyethylene, polypropylene, polyvinylchloride, polyvinylidene chloride, polyvinylalcohol, polyacrylonitrile, nylon, polyester and cellulose derivatives, and blended polymers consisting chiefly of polymers from said group.

2. A method according to claim 1 wherein the two kinds of films range from tapes of narrow width to much wider films.

3. A method according to claim 1 wherein one of the two kinds of films is a homopolymer and the other of the two kinds of films is a copolymer of said homopolymer.

4. A method according to claim 1 wherein each of the two kinds of films is made of copolymers of said group, but the amounts of the principal monomer in the two copolymers are different.

5. A method according to claim 1 wherein each of the two kinds of films are made of the same polymer, but differ from each other in crystalline polymer content.

6. A method according to claim 1 wherein two kinds of films are made of the same polymer, but have different molecular orientation due to the difference of the condition for film preparation.